United States Patent
Armstrong et al.

(10) Patent No.: US 7,428,520 B2
(45) Date of Patent: Sep. 23, 2008

(54) GRAPHICAL USER INTERFACE FOR USE WITH OPEN EXPERT SYSTEM

(75) Inventors: Robert Edward Armstrong, Hunt Valley, MD (US); Raymond John Michels, New Freedom, PA (US); Glen Richard Davis, Parkton, MD (US); John Thulin Page, White Hall, MD (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 32 days.

(21) Appl. No.: 11/130,860

(22) Filed: May 17, 2005

(65) Prior Publication Data
US 2006/0106745 A1 May 18, 2006

Related U.S. Application Data

(60) Provisional application No. 60/627,152, filed on Nov. 15, 2004.

(51) Int. Cl.
*G06N 5/00* (2006.01)

(52) U.S. Cl. .......................................... 706/47; 706/45
(58) Field of Classification Search ................... 706/45, 706/47; 707/100; 726/26
See application file for complete search history.

(56) References Cited

U.S. PATENT DOCUMENTS

| | | | |
|---|---|---|---|
| 5,701,400 A * | 12/1997 | Amado ......................... 706/45 |
| 5,892,900 A * | 4/1999 | Ginter et al. .................. 726/26 |
| 5,980,096 A * | 11/1999 | Thalhammer-Reyero .... 707/100 |
| 7,213,009 B2 | 5/2007 | Pestotnik et al. |
| 7,230,529 B2 | 6/2007 | Ketcherside, Jr. et al. |
| 2007/0213602 A1 | 9/2007 | Ketscherside, Jr. et al. |

OTHER PUBLICATIONS

Tsakomas et al, Evolving rule-based systems in two medical domains using genetic programming, Artificial Intelligence in Medicine, FEB 2004, p. 195-216.*
PCT Search Report.

* cited by examiner

Primary Examiner—Wilbert L Starks, Jr.

(57) ABSTRACT

A rules system for creating rules to an expert system is provided, the rules system providing a user-friendly, guided process for creating such rules.

28 Claims, 16 Drawing Sheets

GRAPHICAL USER INTERFACE FOR USE WITH OPEN EXPERT SYSTEM

BACKGROUND OF THE INVENTION

1. Field of the Invention

The present invention relates generally to a system for creating and editing expert rules to be used in an expert system and a method of using the system.

2. Discussion of the Related Art

The healthcare industry uses information technology to track many different parameters pertaining to different aspects of patient care. For instance, in a hospital setting, patient demographic information is collected and stored when a patient first checks into a hospital for care. The hospital personnel then have access to a variety of information regarding the patient, such as health insurance provider, primary physician and previous health history. Additionally, the database may contain information from previous visits or stays at that hospital. If the patient has checked into the hospital previously or used the services of a hospital subsidiary, any previous test result information may be available to hospital personnel as well. This data represents a wealth of information regarding, for example, the types and frequency of infectious diseases in the community serviced by the hospital.

Most hospitals maintain infectious disease departments. The infectious disease department tracks the types of infectious diseases that have entered the hospital via patients and also those infectious diseases that still remain in the hospital. For instance, during the recent SARS outbreak in Hong Kong, patient demographic information was of interest because it could help localize the area where the infections occurred or limit the infections to a particular demographic of the community, such as cruise line employees. By storing information regarding patient demographics and the types of infectious diseases, a database is generated from which data can be extracted to determine different features of the infectious disease. As another example, analysis of the patient demographic data may pinpoint that an infectious bacterium only infects the elderly during the summer months.

Independent laboratories also maintain databases of patient demographic information and the results of all of the various tests performed at each laboratory. These labs look for trends and patterns within their databases so they can provide greater service to the physicians that use their services. Whether a physician uses a hospital laboratory or an independent laboratory, the ability of these laboratories to analyze the data each has collected and stored in a database provides physicians with valuable information regarding the treatment of an infection.

Referring to FIG. 1, the clinical database 10 receives test results from a variety of test sources that provide different perspectives of a given organism. For instance, if an infectious disease is tested in an identification (ID) and antimicrobial susceptibility test (AST) 60, the physician will be provided with data regarding the probable identity of the bacterium as well as the antibiotics that may destroy the bacterium. In addition, the physician will be provided with information about the doses necessary to kill the bacterium.

Other tests 50 use deoxyribonucleic acid (DNA) methods to detect sexually transmitted diseases (STDs), such as gonorrhea and Chlamydia, and the results are stored in the database 10. The results from blood culture test 20, as well as other tests 30, are also stored in the database 10.

The clinical database 10 stores the clinical test result data. The clinical database 10 has patient demographic information 40 similar to the hospital check-in database. Over the past decades, the hospital databases contain more and more information regarding a wide range of infectious disease, as well as patient demographic information. Additionally, the tests, 20, 50 and 60 may be capable of receiving information from the clinical database 10.

Microbiologists use clinical databases 10 to monitor the evolution of bacteria, viruses and other microorganisms. Today, the field of microbiology is a complicated mix of evolving microorganisms, drugs, and information. Expert systems were developed to take advantage of the extensive amount of information accumulated regarding the interaction of drugs, human subjects and microorganisms. The expert system is able to identify patterns of interactions between drugs, human subjects and microorganisms and provide a microbiologist with a probable result based on these patterns of interactions. But as new drugs are developed, as microorganisms develop resistance to drugs, the microbiologist must also change the expert system to react to these developments and changes.

In order to analyze the data, expert systems were developed to perform analysis of the data stored in the various clinical and hospital databases. The expert system typically is a rules-based system that analyzes data to prove a hypothesis regarding the data under test. Rules are written so a user may check the clinical database for information regarding drug result patterns, patient demographic patterns, specimen information and other related information stored on clinical database. Rules comprise a set of conditions and a set of actions to perform when the conditions are met. The rules are typically in the form of a question with an IF-THEN format. The hypothesis to prove is the basis for which types of questions to ask. For example, to prove that species *Escherichia coli* are resistant to a form of penicillin, such as, Ampicillin, the question may be IF Ampicillin does not kill this species of *Escherichia coli* THEN this species of *Escherichia coli* is resistant to Ampicillin. This would be an example of the high-level logic from which a syntax and structure intensive expert rule would be formed.

As stated above, the creation of a rule for a conventional expert system is time consuming because several people are involved and each must perform a separate task. Referring to FIG. 2, typically, a microbiologist conceives a concept for a rule (S200), but must wait to discuss the rule concept with a microspecialist, who is familiar with the expert system. After discussing the rule concept with the microbiologist, the microspecialist formulates a logical expression of the conceptual rule (S220). Finally, a software engineer places the logical expression into the proper structure and syntax for execution by the expert system (S240). Once this is done, the microbiologist, microspecialist and software engineer (collectively, the developers) await the result output by the expert system (S260). If the rule successfully runs or executes on the expert system, the developers have done their jobs. The rule can be applied to data from the clinical database, potentially modifying that data (S280). However, one task remains to be done. The microbiologist must now determine if the rule is providing the expected or a satisfactory output. To do this, the microbiologist will have to input different data sets of either made-up data or real data mined from the database. This, too, can be a time consuming task and cannot be done automatically by the expert system.

If the rule fails in step S260, the software engineer must check his or her work, the microspecialist must check his or her work, and the microbiologist must wait to perform his or her review of the results. Therefore, when the rules input by the users do not follow the syntax, the expert system will not interpret the rule and may not even inform the users of the cause of the syntax error. This frustrates the users of the expert system. Even more frustrating are minor logic or syntax errors that are interpreted by the system, but do not generate the result expected by the user. To avoid frustrating the users, the vendors of the expert systems must provide a considerable amount of training to teach the users the correct syntax and rule structure. The time constraints on both the vendor and the user typically cause training to be brief or incomplete. Another disadvantage to extensive training is not only the expense of providing the training, but the actual time lost when the users could be performing other tasks.

Finally, in order for the expert system to be widely accepted by users both in the United States and abroad, the expert system must accommodate a multitude of standards set by both governmental and non-governmental organizations. For instance, some of the organizations that provide such standards are the German Standards Institute (Deutsches Institut für Normung or DIN), and the National Committee for Clinical Laboratory Standards (NCCLS). If the expert system does not meet the standards to which the user hospital or independent laboratory certifications are held, these users will not purchase the expert system from the vendor.

Therefore, there is a need for an expert system that allows for easy rule creation, while accommodating a large percentage of the standards set by the relevant governmental and non-governmental organizations.

SUMMARY OF THE INVENTION

Embodiments of the present invention can provide the user with an easy-to-understand, straightforward, guided editor system to create rules to be run on an expert system. The editor system overcomes the deficiencies of the prior art by allowing the user to use simple, well-known expression formats to create rules. Based on a building-block type model, the user pieces together text-based rule expressions with the help of a rule creating and editing system, preferably implemented as a graphical user interface (GUI). However, the rule creating and editing system is not limited to a GUI and may be presented to the user in any other suitable type of user interface. (For descriptive purposes, the only expert system discussed herein is an expert system for use in infectious disease applications. However, as will be apparent to one skilled in the art, the invention is applicable to any system which treats data in a similar manner, whether inside or outside the medical field. Similarly, while the system and process of embodiments of the invention are described herein in a particular order of steps, other arrangements of the steps are possible.)

A system for creating and editing rules for use with an expert system comprises a rule editor, a block manager, a rule manager and a test scenario facility. The rule editor is used to create or edit text-based rule expressions to be used by an expert system. The block manager is used to verify the logic of the text-based rule expression. The rule manager converts the text-based rule expression into a valid rule interpretable by the expert system. The test scenario facility creates a template into which sample data values can be entered. After the sample data values have been entered, the rule is executed for the sample data and the results of the executed rule are displayed. If the results are those expected by the user, the rule is set to test mode, during which it is run alongside preexisting rules to continue to monitor its output, but in test mode the rule is not allowed to modify real data. If the rule operates as expected in test mode, the user may promote the rule to an enabled rule that is authorized to modify real data in a clinical database, alongside other preexisting system rules. (Note that it is possible to skip the test mode and go directly from the test scenario evaluation to enabled mode.)

In particular, the test scenario facility tests the validity of at least one of said text-based rule expressions created by the user, once the user creates the expressions by inserting data values into a template created by the rule editor. The rule is then tested to determine if the rule executed in the manner expected by the user. The user may also insert different inappropriate sample data to insure that the rule does not execute in an unexpected manner. The block manager preferably has an indicator that indicates the status of conditions and actions in the text-based rule expression. The rule editor also allows the user to set the order in which the rules will be executed with respect to other rules. In other words, the user may establish a rule hierarchy based on the priority of the rule created by the user with respect to other rules.

Indicators are output to the GUI to provide the user with information regarding which parts of the rule are logical, illogical, correct and incorrect. This relieves the user from having to evaluate the proper structure and syntax of the expert rules. Embodiments of the present invention, by providing a rule editor that guides the user through the rule creation procedure, tests the logic of the rule, and provides visual and audible indicators regarding the rule, prevent the user from creating a rule that will not function properly.

In addition, embodiments of the present invention can include a method for a user to create and edit rules for an expert system, which comprises the steps of inputting conditions and/or actions, considering appropriate logical choices for the conditions and actions presented by the system, selecting the conditions and actions from those presented, repeating those steps until being presented with a final choice for a logical condition or action, creating a test scenario for testing the conditions and actions selected by the user by populating the test scenario template with sample data, initiating execution of the rule by the system and evaluating the results, if the results are those expected, setting the rule to test mode to run with but not modify real data, and, if the results on the real data are those expected, promoting the rule to an enabled rule that can be fully executed on real data. (Note that it is possible to skip the test mode and go directly from the test scenario evaluation to enabled mode.)

Furthermore, an embodiment of the invention can be implemented as an apparatus for creating and editing rules for analyzing data stored in a database. The apparatus comprises an input device, a processor, a display with audio output and a database. The input device allows the user to input rule expressions through a computer input device. The processor tests the rule expression logic and, if the logic is correct, the rule expression is transformed into a rule useable by the expert system. The display and audio output provide the user with visual and audible indicators. The database contains data as described above, which is analyzed by the expert system using rules created and edited by embodiments of the present invention.

Embodiments of the present invention can overcome the deficiencies of the prior art by providing the microbiologist or any other user with the capability to author a rule that is automatically checked for correct logic and tested against real-world data from the clinical database for the expected outcome. Additionally, a number of people do not have to collaborate merely on drafting a proper rule, but may focus instead on making a better rule. Therefore, personnel are used more efficiently, troubleshooting time is reduced, and users have more control over the expert system.

Additionally, embodiments of the present invention can seamlessly transform the rule created by the user into a rule executable by the expert system without further actions by the user.

BRIEF DESCRIPTION OF THE DRAWING FIGURES

The preferred embodiments of the invention will be more readily understood with reference to the embodiments thereof illustrated in the attached drawings, in which.

Throughout the drawing figures, it should be understood that like reference numbers refer to like features and structures.

DETAILED DESCRIPTION

A rule creating and editing system in accordance with embodiments of the present invention can provide guidance to the user in the authoring of a proper expert system rule. In this instance, the user may be a microbiologist, a laboratory technician, or any other authorized person. Embodiments of the present invention can alleviate the need for a software engineer or a microspecialist to work with the microbiologist to help draft a rule. For purposes of illustration, the interface of the rule creating and editing system will be described as a GUI, although other types of user interfaces may be used.

Figure 1:
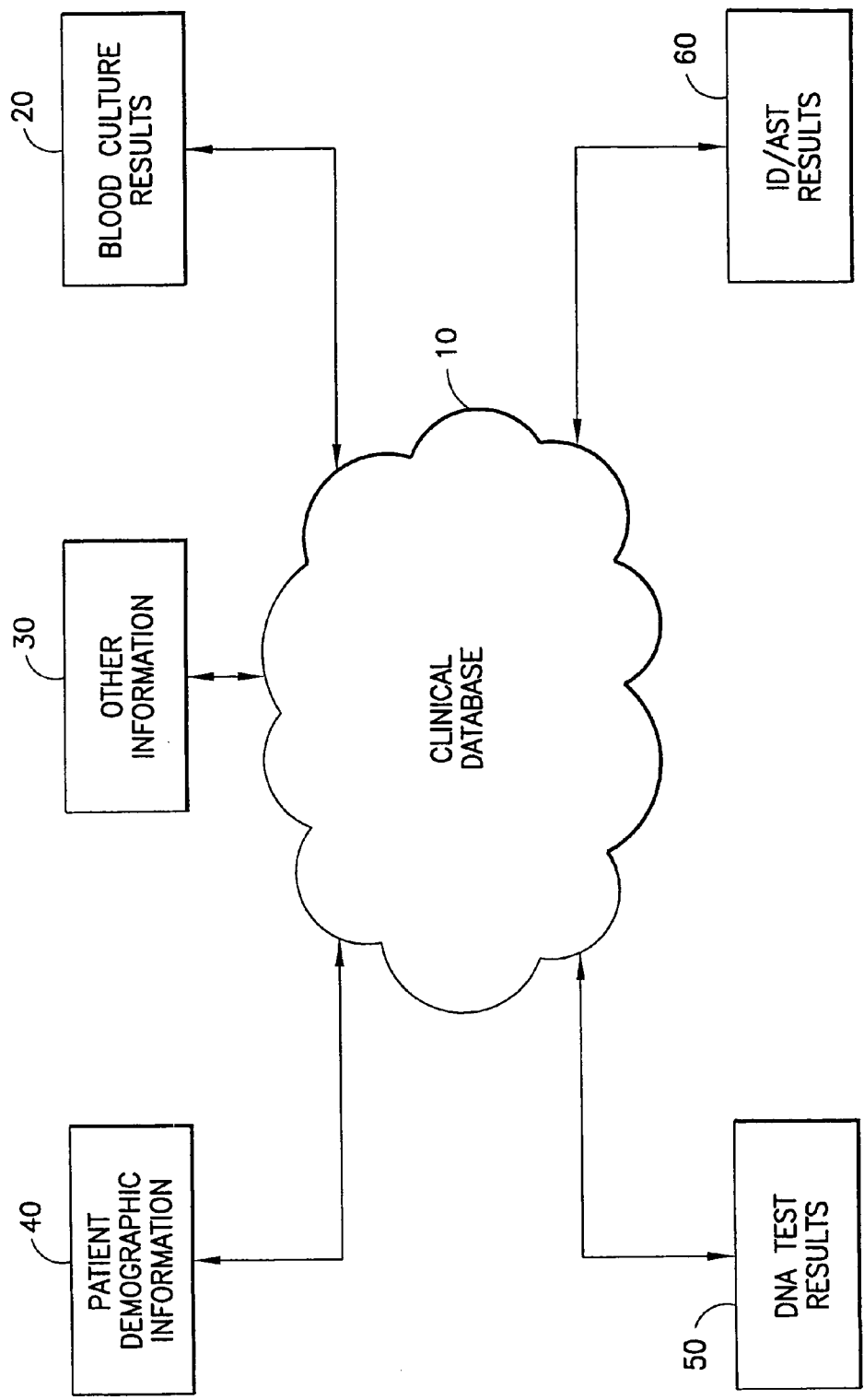
FIG. 1 shows the interaction between a clinical data base and the various testing devices and information gathering devices.
Figure 2:
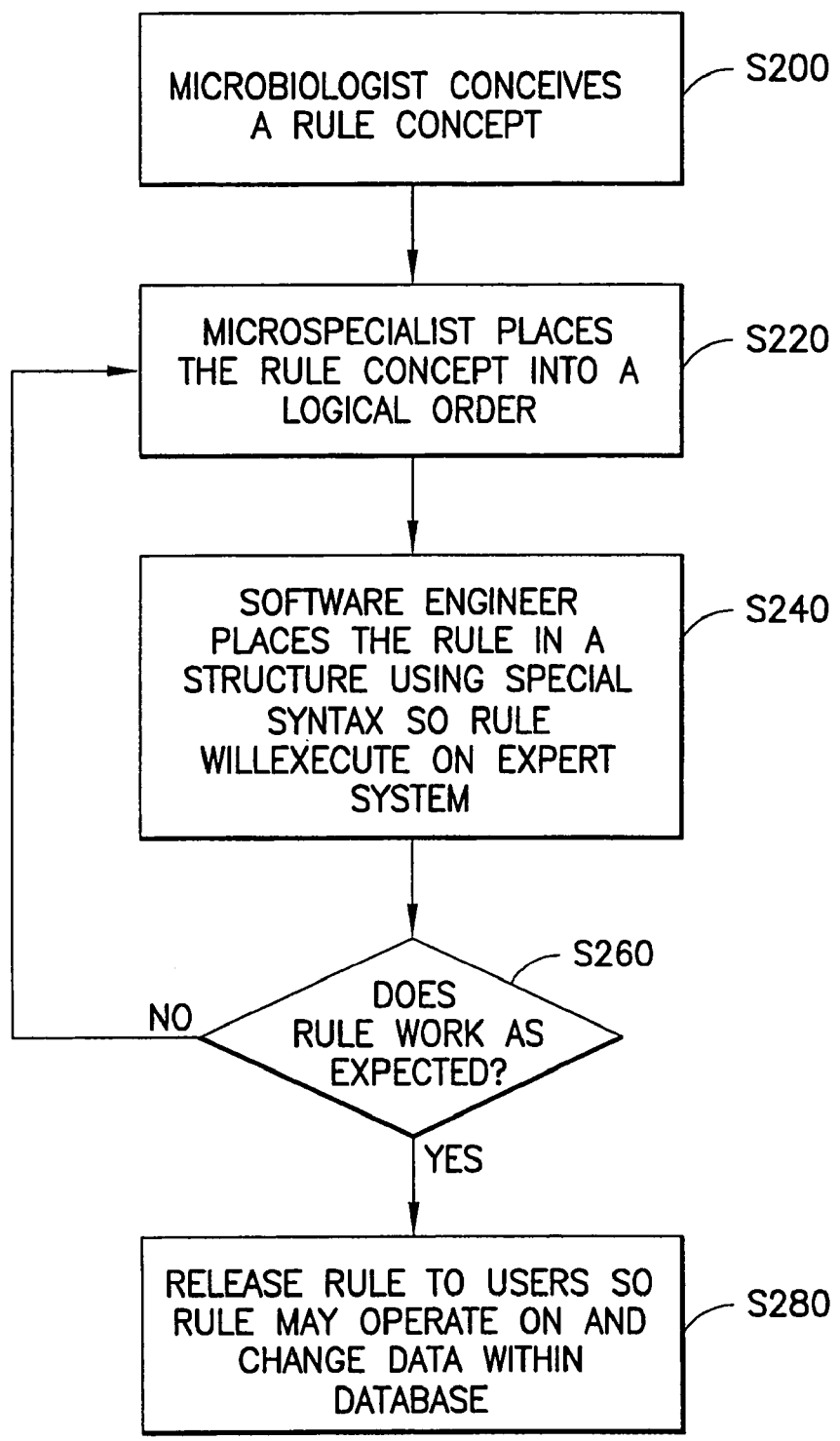
FIG. 2 is a flow chart outlining the typical steps in the conventional rule creation environment.
Figure 3:
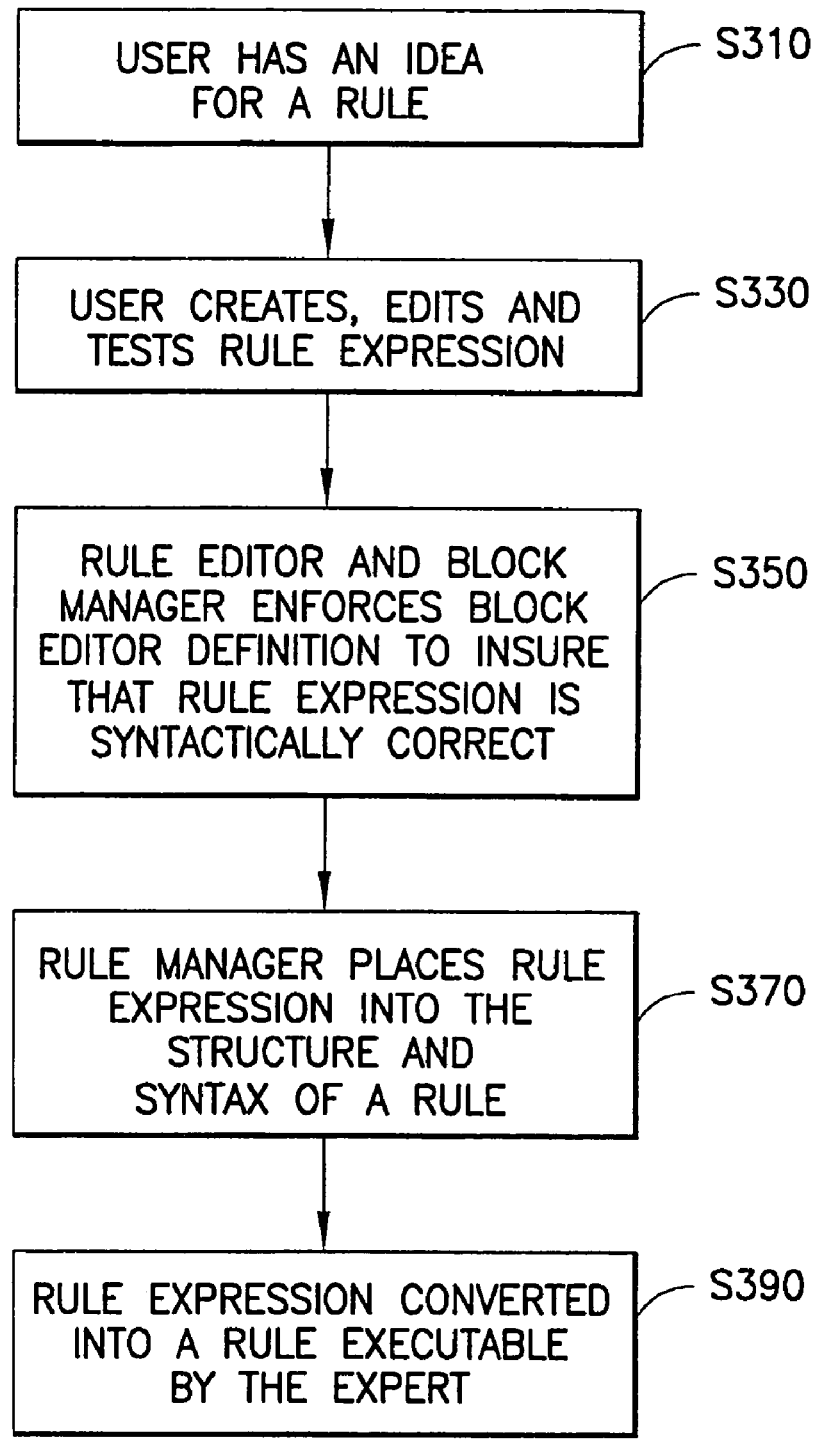
FIG. 3 is a flow chart outlining the steps for a user to create a rule in accordance with an embodiment of the present invention.

Referring first to FIG. 3, the user begins by having an idea for a rule (S310). The user can go directly to a computer and begin authoring a rule in the rule editor of the graphical user interface by entering a rule expression (S330). The rule expression is a text-based description of a rule that will be executed by the expert system engine. The text-based rule expression is the internal representation of the rule that is passed between the rule editor and rule manager, and stored in the rules database. Basically, the rule expression is a human-readable version of an executable expert system rule. Once the user has authored the rule expression, the rule editor and the block manager enforce the allowed syntactical relationships of the rule expression (S350). The block manager enforces the syntactical relationships of the rule expression based upon the block editor definition that will be described later in more detail. The block manager insures that the user will only be presented with syntactically appropriate choices for conditions and actions. Once the user has created a syntactically correct rule expression, the rule expression is passed to the rule manager. The rule manager places the rule expression into the structure and syntax of a rule (S370). After the rule manager places the rule expression into the structure and syntax of a rule, the rule is transformed into a rule executable on the expert system (S390). Once the rule is determined to be valid, it can be used with historical and new data on the clinical database data, and is allowed to modify data.

Figure 5A:
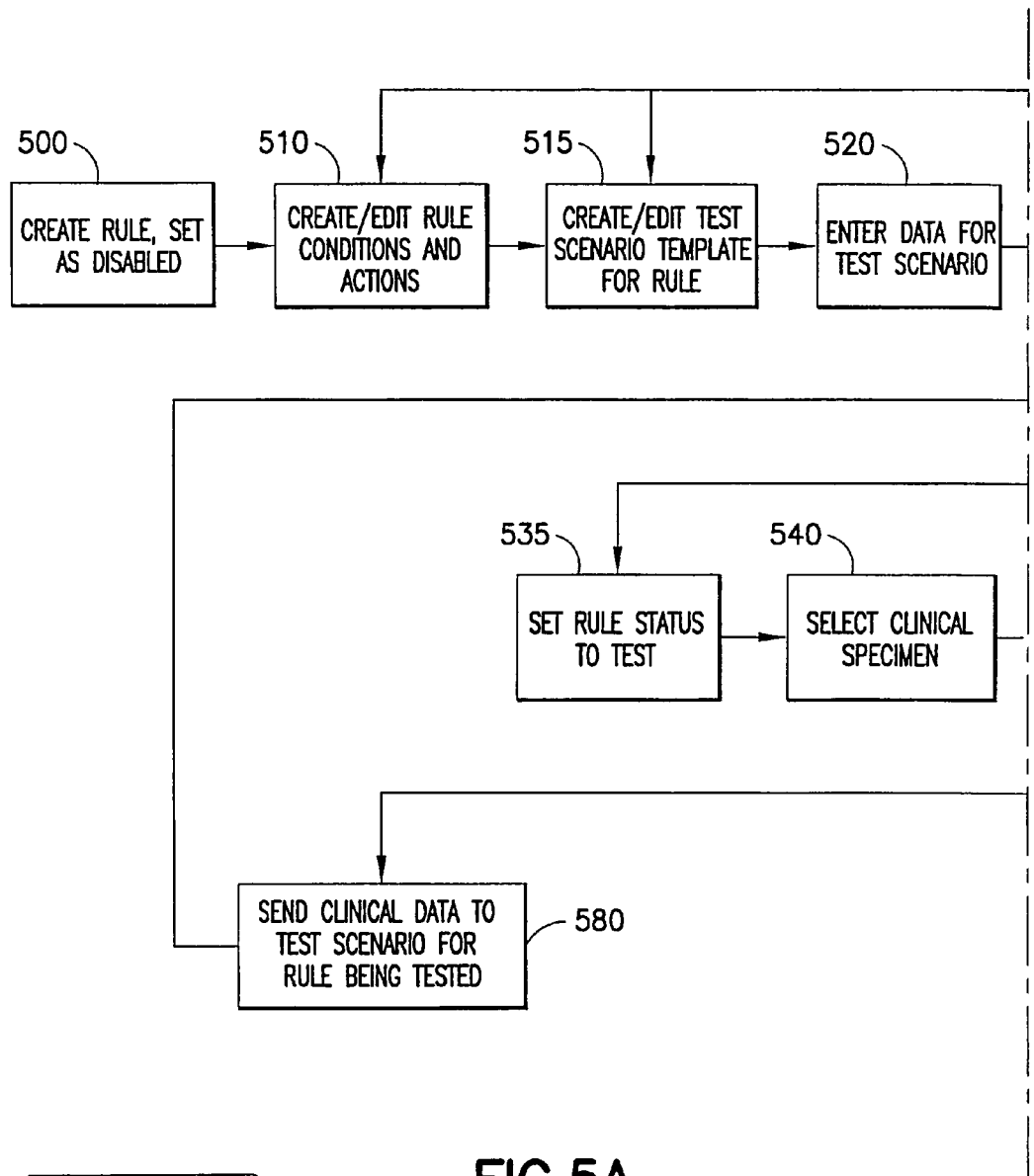
FIG. 5 is a flow chart outlining the steps taken to validate that a rule will operate properly in accordance with an embodiment of the present invention.
Figure 5B:
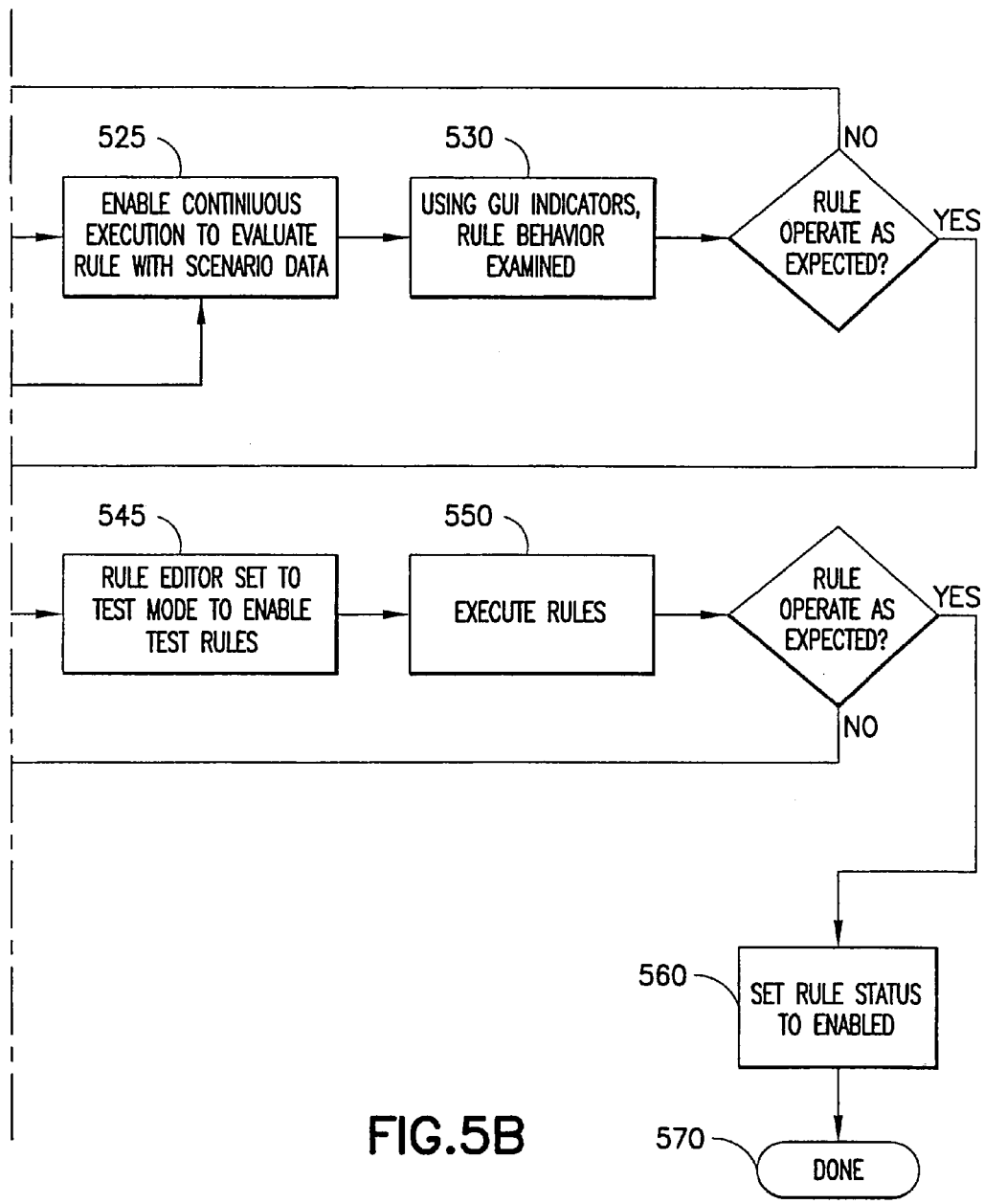

The above description with respect to FIG. 3 provided a high level overview of the GUI rule creation. The block manager and rule manager run in the background of the rule editor. The user preferably only sees the results of the work done by the block manager and the rule manager on the display. The steps taken by the user for a rule to graduate from a user input rule to a rule executable by the expert system that can operate on real-world clinical database data is shown in FIG. 5, described below.

Figure 4:
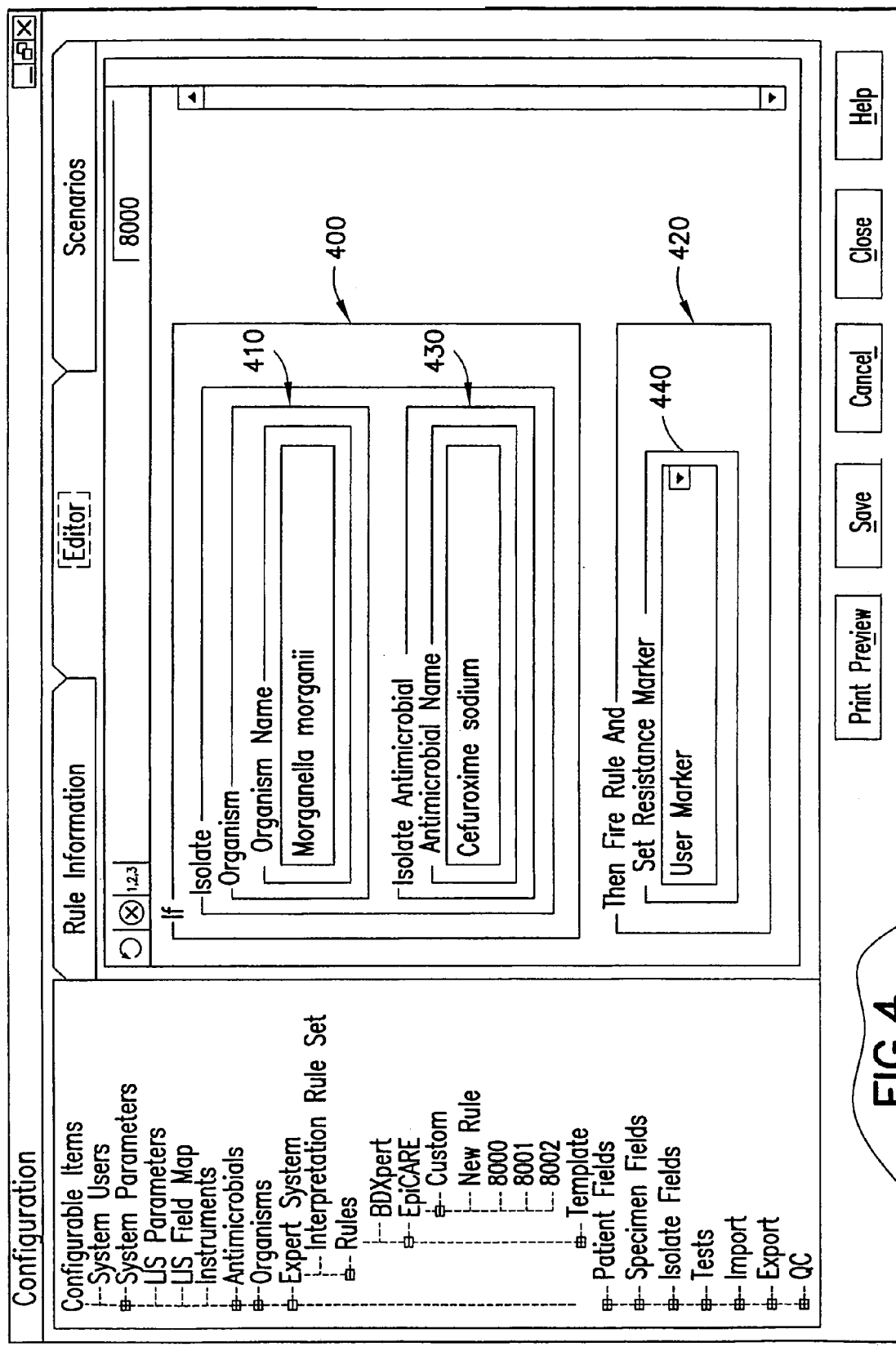
FIG. 4 is an exemplary screenshot of the rule editor input screen according to an embodiment of the present invention.

Referring to FIG. 4, an exemplary screenshot of what the user sees when creating or editing a rule is shown. The rules are preferably constructed in an IF-THEN format, such as, if X condition occurs then do Y action. As shown, the data entry fields are organized as a group of blocks. Specific blocks are selected by the user and filled with data that corresponds with the specific block. For instance, the IF block 400 is populated with specific nested blocks, 410 and 430, that the user would like to be the conditions for the rule. Nested block 410 identifies the name of a specific organism that the user wants to isolate in the database, in this example, "Morganella morganii." Nested block 430 identifies the name of the antimicrobial "Cefuroxime sodium" that was used to treat a patient infected with Morganella morganii. The IF block statement of the rule is instructing the expert system to detect occurrences of the organism Morganella morganii and antimicrobial Cefuroxime sodium in the same patient data. The THEN block 420 sets the action to be performed if the conditions, 410 and 430, in the IF block 400 are found to be true. In other words, in the example illustrated, for patients found infected with the Morganella morganii organism and treated with the Cefuroxime sodium antimicrobial, the action, Set Resistance. Marker, in action block 440 is performed after the rule executes. In this case, the resistance marker is set equal to the User Marker as shown in the action block 440.

Figure 6:
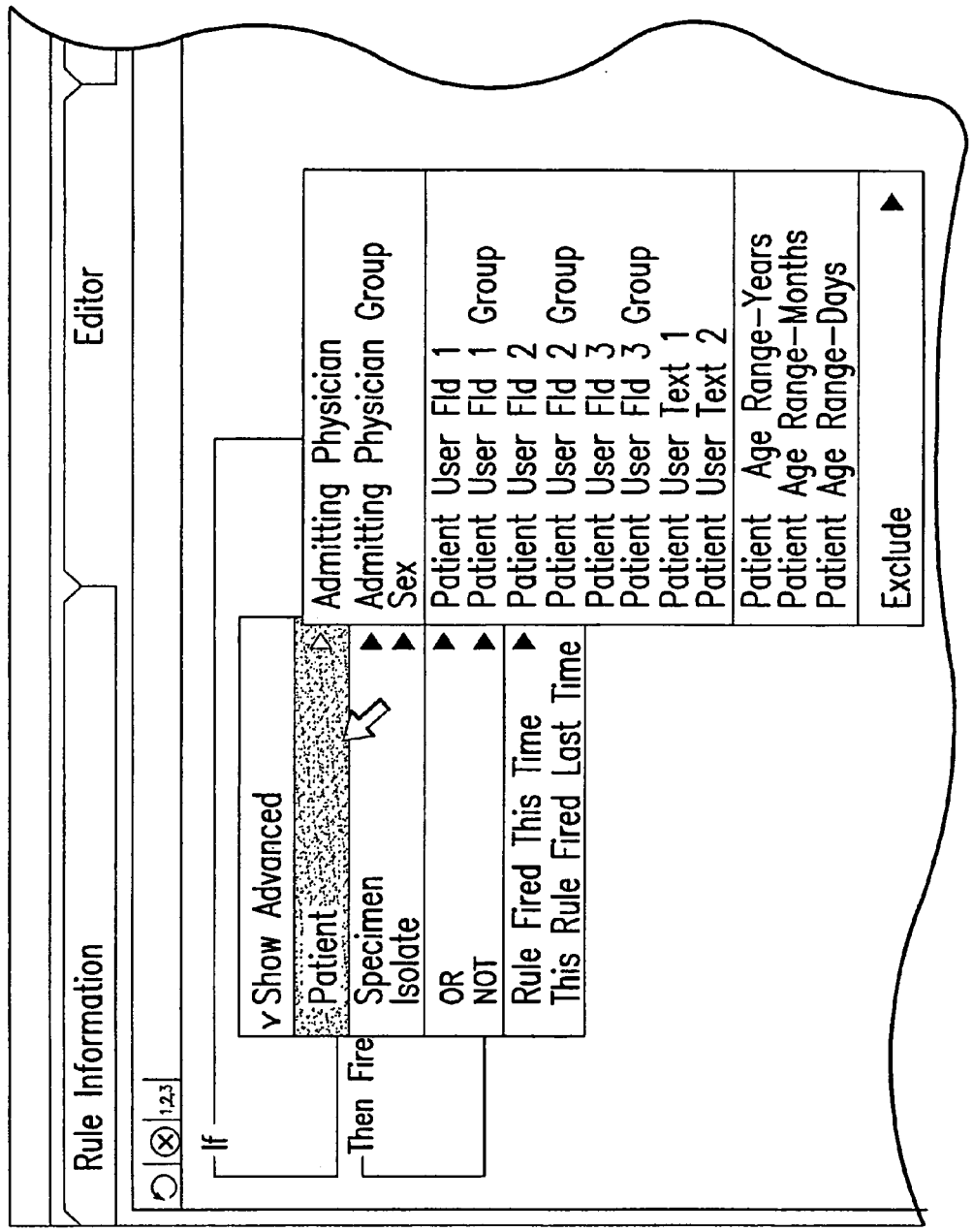
FIG. 6 is an exemplary screenshot of the selections possible in the patient category according to an embodiment of the present invention.
Figure 7:
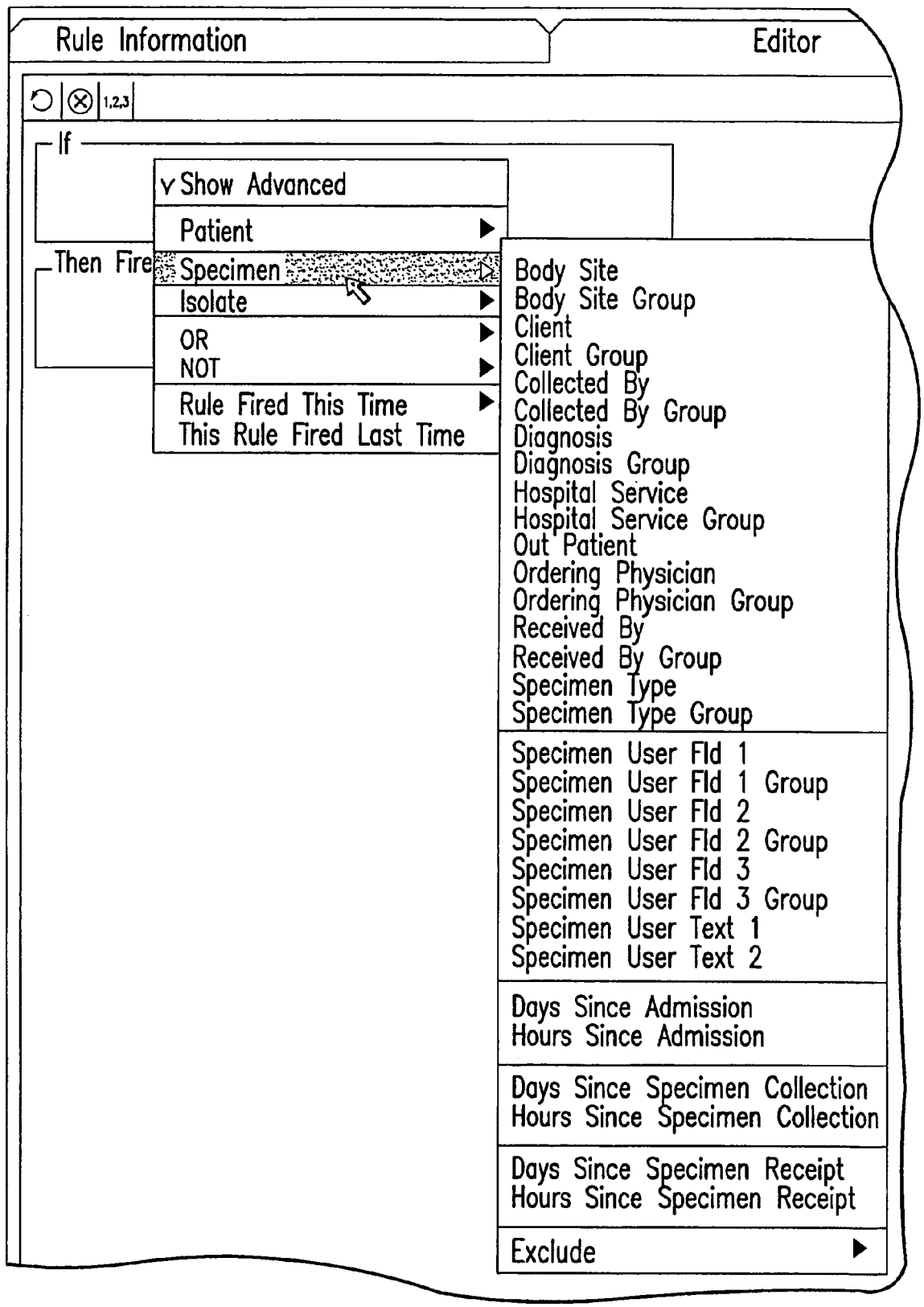
FIG. 7 is an exemplary screenshot of the selections possible in the specimen category according to an embodiment of the present invention.
Figure 8:
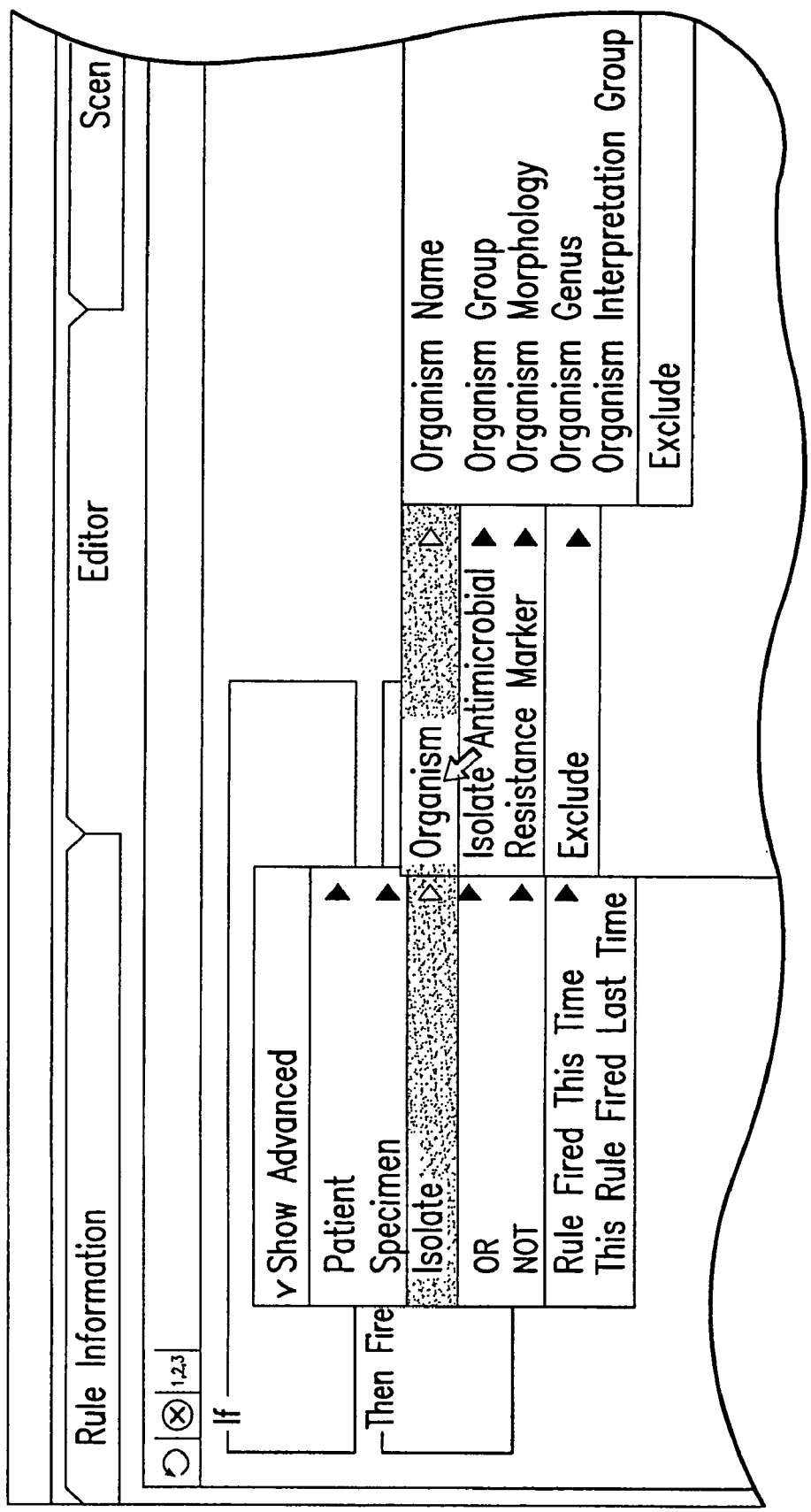
FIG. 8 is an exemplary screenshot of the selections possible in the isolate category according to an embodiment of the present invention.
Figure 9:
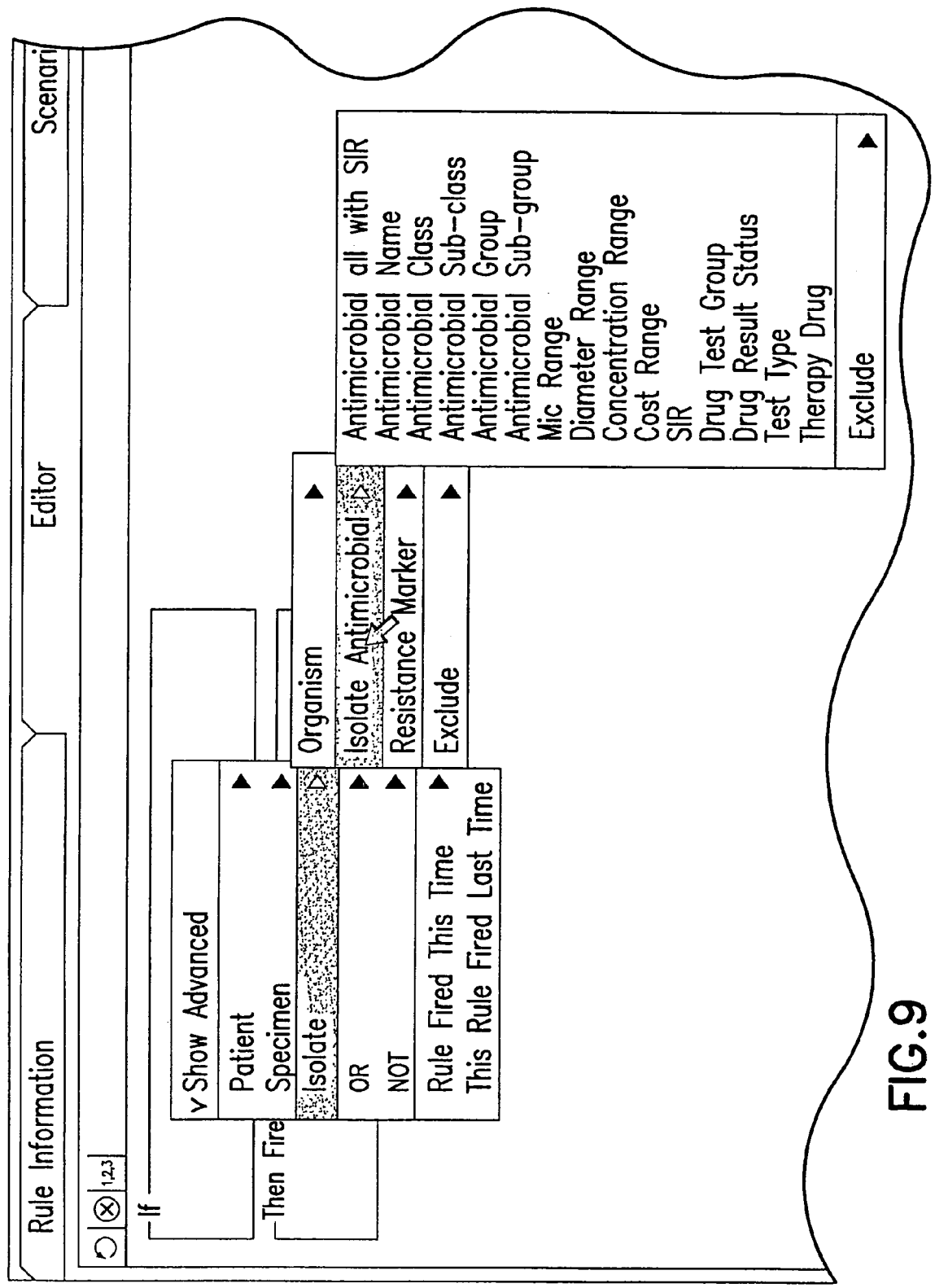
FIGS. 9 and 10 are exemplary screenshots of the additional selections possible in the isolate category.
Figure 10:
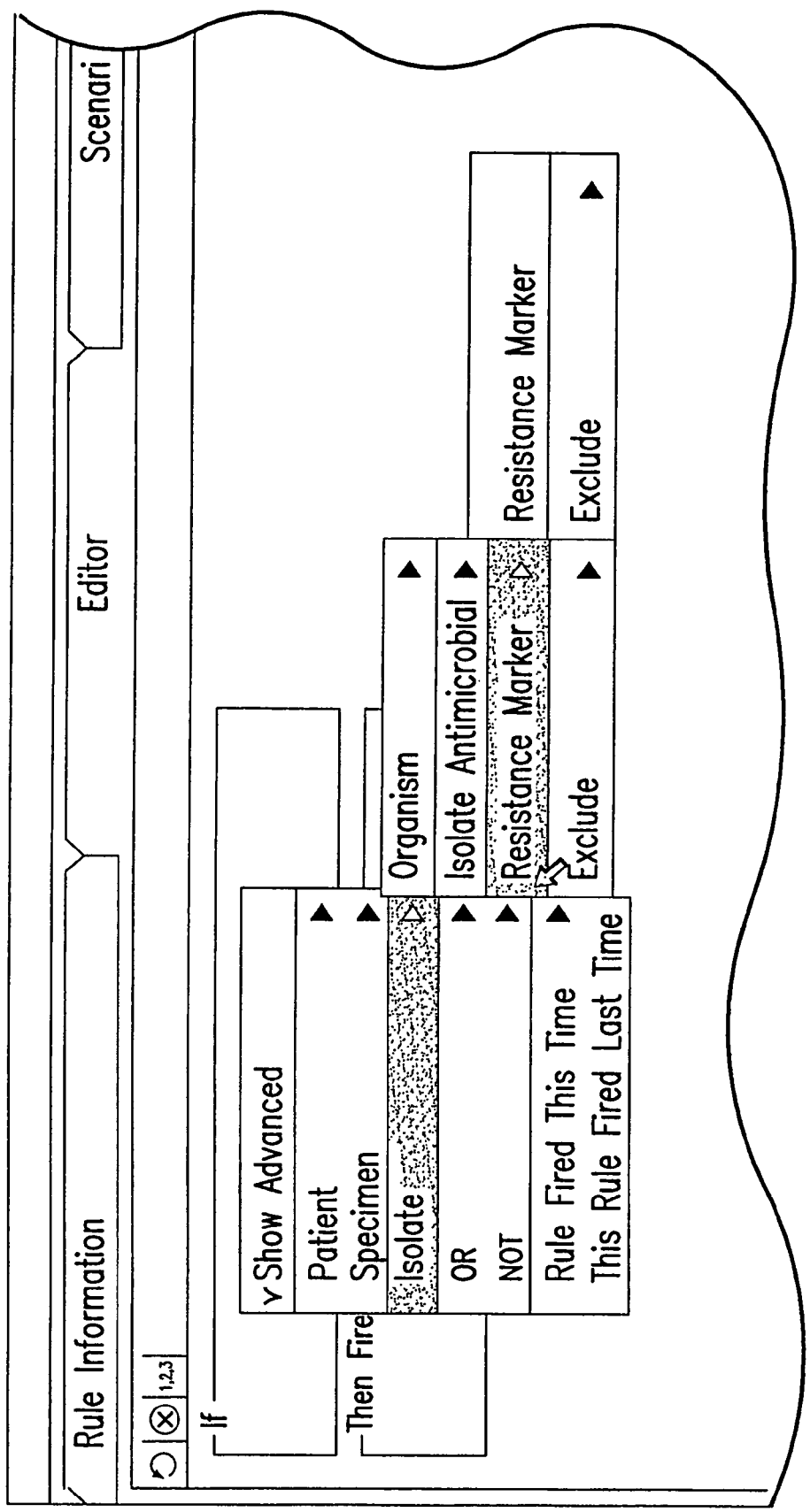
Figure 11:
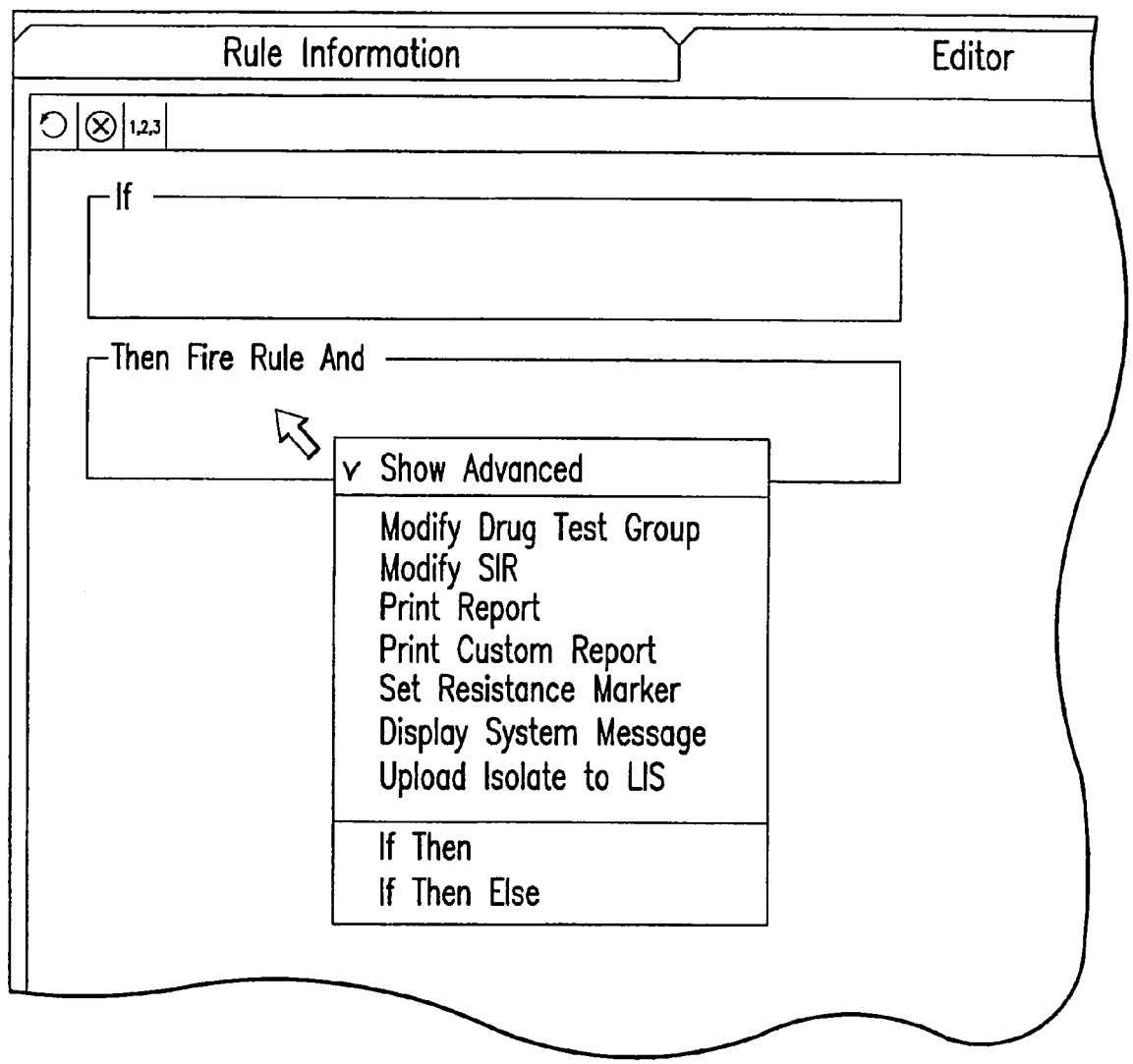
FIG. 11 is an exemplary screenshot of the selections possible in the actions category according to an embodiment of the present invention.

The above described embodiment of the invention provides the user with the capability to test the rule to determine if the user has created a proper rule and ultimately a rule that provides the expected results. The process of creating, editing and validating a rule is shown FIG. 5. Referring to FIG. 5, the user begins by creating or editing an existing rule (500) with the rule status set to "Disabled." The user then populates the block structure displayed on the screen with data categories and values that the user desires the expert system to analyze (510). These data categories may be either patient, specimen or isolate data categories. Within each of these subcategories are several other subcategories from which the user may select. FIG. 6 shows an exemplary screenshot of the selections possible in the patient category, while FIGS. 7 and 8 show exemplary screenshots of the selections possible in the specimen and isolate categories, respectively. FIGS. 9 and 10 further illustrate the additional options available in the isolate subcategories. Once the conditions are set, the user then must choose the action that is to be performed, if the rule executes. FIG. 11 shows an exemplary list of the actions from which the user may choose to perform. Of course, the user may select multiple conditions including nested conditions to be analyzed by the rule. Additionally, the user may select multiple actions to be performed when the rule executes.

With respect to the status of the rules, all of the custom or user-created rules in the expert system are assigned one of three status identifiers: disabled, test or enabled. Initially, when the user creates a rule, the status of the rule is disabled. This prevents the inadvertent use of the rule on real data within the database. If this protection were not available, the user could potentially create rules that may change important data values in the database unexpectedly. As the logic of the rule is tested and the results verified for the data input by the user, the user is given the opportunity to test the rule, as it would be run with other rules presently in the expert system. At this point, the status of the rule is changed to "test" status and the rule will be executed based on its priority with other rules within the expert system. Additionally, the rule will be applied to clinical results from the clinical database, but will not be able to modify any of the historical data in the clinical database. Running the rule on real historical clinical data will give the user a better understanding of how the rule will interact with the other rules on the expert system. If the rule provides an unexpected or unwanted result, the user again has the opportunity to edit the rule. If the rule continues to provide the expected results and operates correctly, the user may change the status of the rule to "enabled" at which point the rule is authorized to modify live clinical data in the database.

Referring again to FIG. 5, the rule editor creates a test scenario template (515), which the user fills with data to execute the rule (520). The user may fill the test scenario template either manually or by having the system automatically select certain data from the clinical database. By manually filling in the test scenario, the user controls the test scenario and may manipulate the rule using different data values and even invalid data values to thoroughly test the rule. The automatic selection of certain data is performed based on the conditions input into the block structure of the rule. Only data directly relevant to the conditions input will be provided to the user for testing. The user then chooses to continuously execute the rule to evaluate the rule with the data input into the test scenario template (525). As the rule executes, the user is presented with audible and visual indicators by the graphical user interface to show how the rule is behaving (530). The audible indicators may be any suitable indicator including beeps, other sounds, music or spoken words. The visual indicators may be green or red highlighting or any other suitable type of visual indication. If the rule is not operating as expected, the user either edits the rule (510) or edits the test scenario (515). If the user is satisfied with the execution of the rule, the user changes the status of the rule to "Test" (535). Once the rule's status is changed to "Test", the rule is treated like a "System" rule except that the clinical database's data will not be and cannot be modified by the rule. This allows one to completely test the rule, to insure that all the rules are run including the preset system rules. This feature provides the user with a view of how the rule will behave in the context of the overall expert system including the rules and the data from the clinical database. This is important because typically it will not be apparent or obvious that a rule will provide unexpected results until the user can see the real results when the rule is run using realistic data values for the conditions being analyzed. Once the system provides results, the user will be better able to analyze the results to determine if the rule is behaving as expected. In fact, the user can use the results to troubleshoot a logically correct rule, but a rule that provides unexpected results nonetheless. The provided results may be completely unexpected, which means that the rule needs to be edited. Or, if the rule provides the expected results, the user continues the rule creation process. Once the rule is promoted to test status (535), the user selects a clinical specimen (540) to populate the test scenario template. In order to test the rule, the clinical system must be switched to a Test mode. (545). At this point, both the expert system rules and the custom rules with a "Test" status are run (550), and if the displayed results are unexpected, these results are sent back to the test scenario template (580) so the user may troubleshoot the rule further. If, on the other hand, the rule provides the expected results, then the rule status is promoted to "Enabled" by the user (560). This change in status places the new enabled rule in the list with other enabled custom rules that execute after the expert system rules execute (570). These newly enabled rules may modify real clinical data in the database.

The GUI can be hosted on a computer system, which has a processor, memory device and a monitor for viewing the rules. The GUI may be written in Visual Basic, Visual C++ or any other suitable programming language. As for the expert system engine, the C Language Integrated Production System (CLIPS) engine, which was developed by NASA at the Johnson Space Center, may be used to host the expert system. Any other similar expert system engine with similar functionality could be used.

FIGS. 6 through 11 show exemplary screenshots of choices available to the user. However, the list of choices may easily be updated at any time to include more or fewer choices. In FIGS. 6 through 11, the "Show Advanced" menu selection is shown checked, so all of the choices available for that category are presented to the user. If the "Show Advanced" menu selection is unchecked, then the most commonly chosen parameter choices within a category are presented to a user. This is an example of how the GUI can be tailored to cover a wide range of user skill levels.

The expert system has a standard set of system rules that may not be changed. These standard rules are made to comply with the standards set by the well known standards setting bodies, such as NCCLS and DIN. The standard rules may also incorporate the findings or teachings of well-respected authorities in the microbiology field. The custom rules created by a user are rules that the user expects will help in the analysis of data for a specific reason, such as the susceptibility of a new strain of bacteria to an experimental antimicrobial agent.

Figure 12:
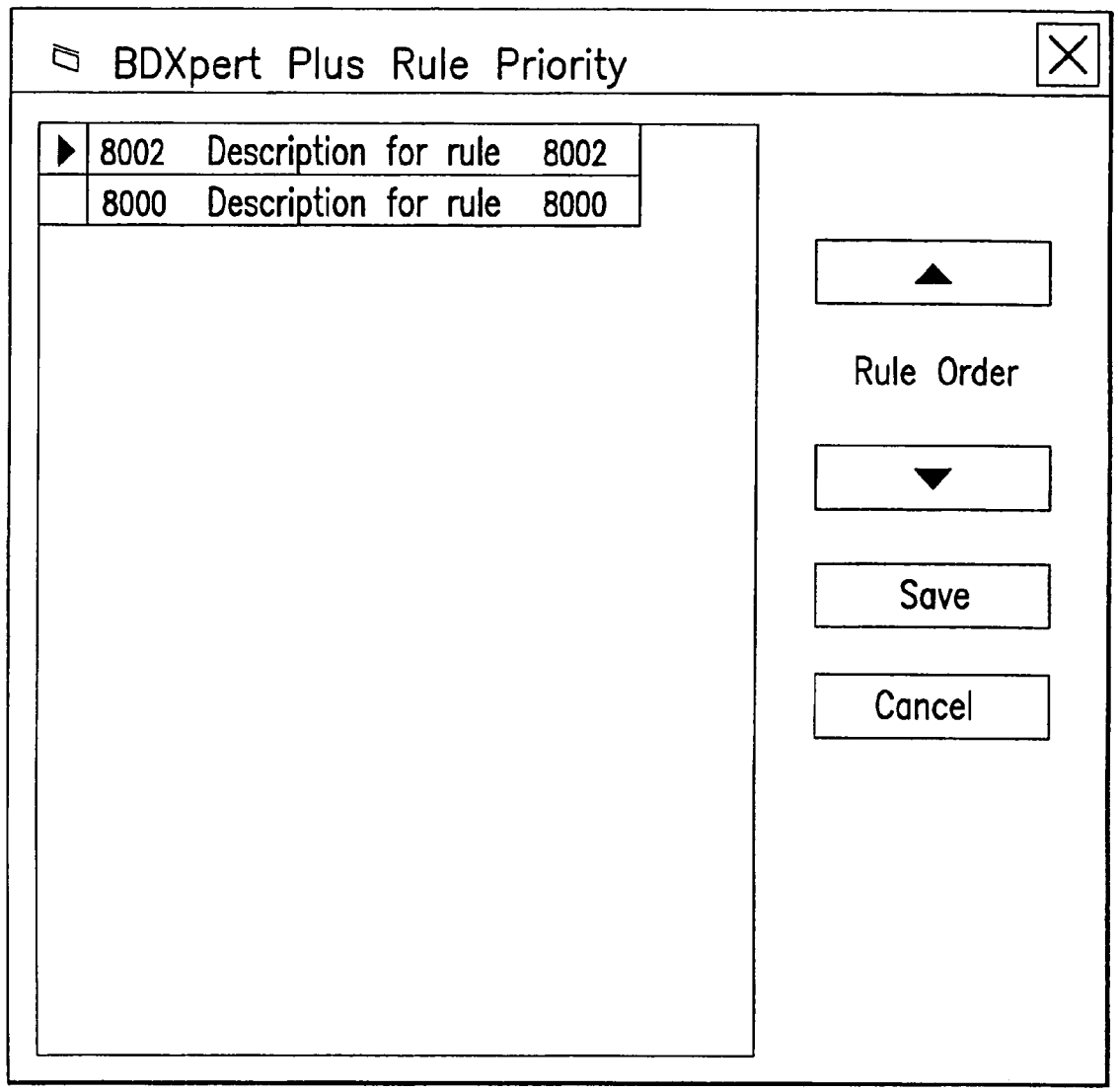
FIG. 12 is an exemplary screenshot of the rule priority setting dialog box in accordance with an embodiment of the present invention.

Embodiments of the present invention can allow the user to assign a priority or salience to the custom rules. The standard system rules have an assigned priority that cannot be changed by the user and always supersedes the priority of the custom user-created rules. However, the user may assign a priority to the custom rules so that the rules will be executed in a known order by the expert system. Knowing the execution order of the rules is important during the creation of the rule if the data expected to be input to the rule may be changed by an earlier rule because the earlier rule has a higher priority. Therefore, the expert system provides the user with the ability to alter the order in which the user-created rules are executed. FIG. 12 illustrates a dialog box that allows the user to set the priority of the rules. The priority of the rules may be changed after the creation of each new rule or changed simply to see the effect of the change. The dialog box provides the user with a list of rules so the user may visualize how the execution order of the expert rules will affect the results.

Typically, the results of standard system expert rules are not to be overwritten because these rules and the subsequent result are based on well-founded historical principles and analysis. As stated above, the standard system expert rules are also based on well-respected teachings of experts in the filed of microbiology, infectious diseases and similar fields. Therefore, the results of standard system expert rules are not usually overwritten. The present system will allow the user to overwrite the results of the standard system expert rules, but not without first verifying if that is the action the user wants to perform. Whenever the user is about to overwrite the result of an expert rule, a dialog box with text such as "Do you want to continue overwriting Expert System results?" or similar language will appear. The user will have the choice of selecting either a YES or NO check box to continue overwriting the system expert rules. In the results display presented to the user, the overwritten rule will have an indicator next to it showing that the standard system expert rule was overwritten by the user.

Figure 13:
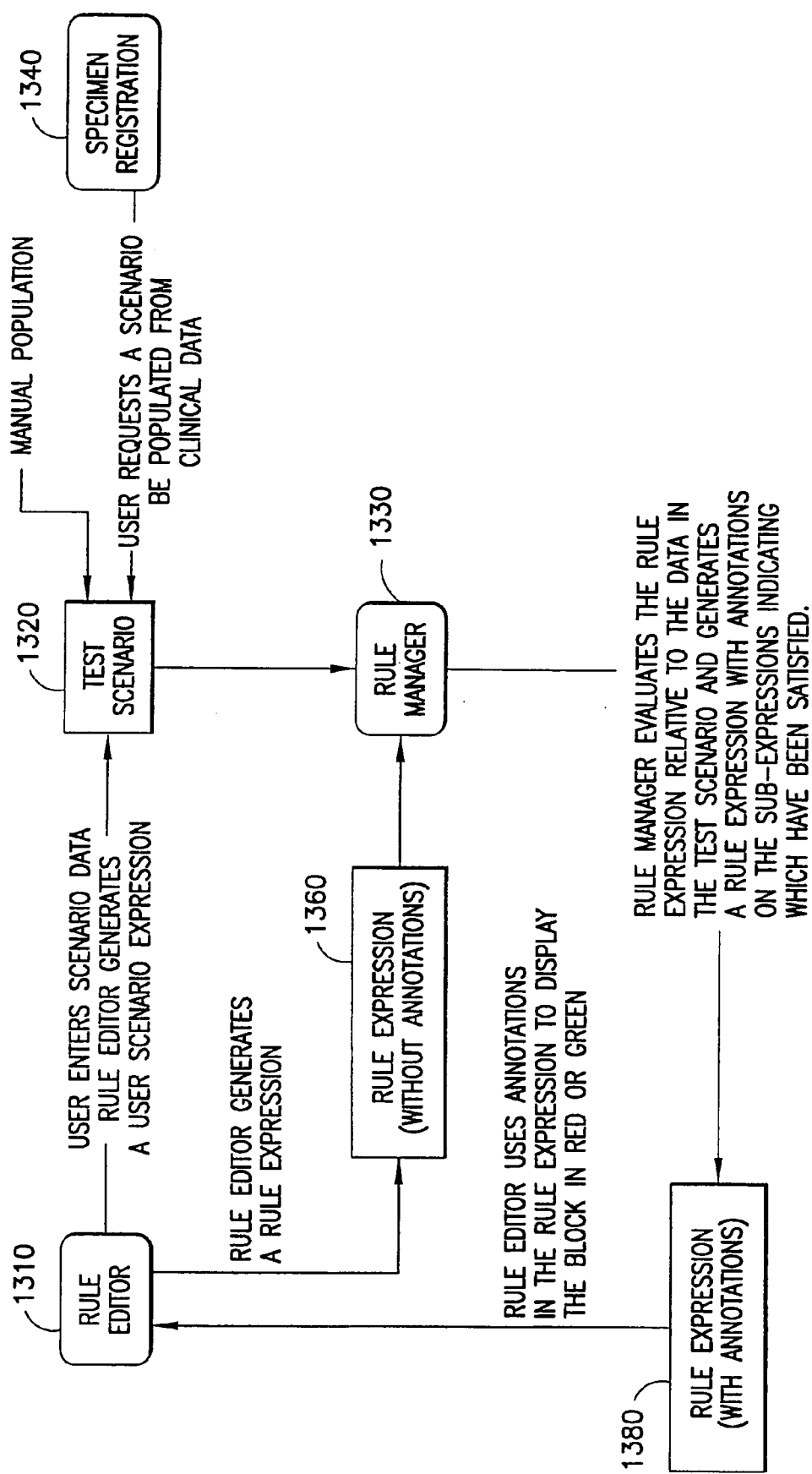
FIG. 13 is a data flow diagram of the creation of a rule and subsequent display to user that the rule is logically correct or incorrect in accordance with an embodiment of the present invention.

A step-by-step example in the rule creation process and the data flow within the system will now be provided. FIG. 13 is a more detailed view of the data flow during the creation and testing of a rule in contrast to the user step flow of FIG. 5. As shown in FIG. 13, the user uses the rule editor 1310 to create a rule expression 1360 and a test scenario 1320. In the test scenario 1320, the user is presented with a template to add the values that are required for the rule expression to execute. The user has the option of either manually entering data values for the parameters (specimen type, organism type, resistance marker, etc.) or automatically populating the template from the clinical data of the specimen registration 1340. The rule expression 1360 and test scenario 1320 are then provided to the rule manager 1330, which evaluates the rule expression in the context of the data provided in the test scenario 1320. The rule manager 1330 then generates a rule expression with annotations 1380. The rule editor 1310 in response to the annotations displays the IF-THEN block structure to the user with the blocks highlighted in either green or red. The green highlighting indicates that the logic for the green highlighted portion of the rule expression is satisfied based on the data in the test scenario 1320, while red highlighting indicates that the logic for the red highlighted portion of the rule is not satisfied. The user is then given the opportunity through the rule editor 1310 to edit the logic.

Figure 14:
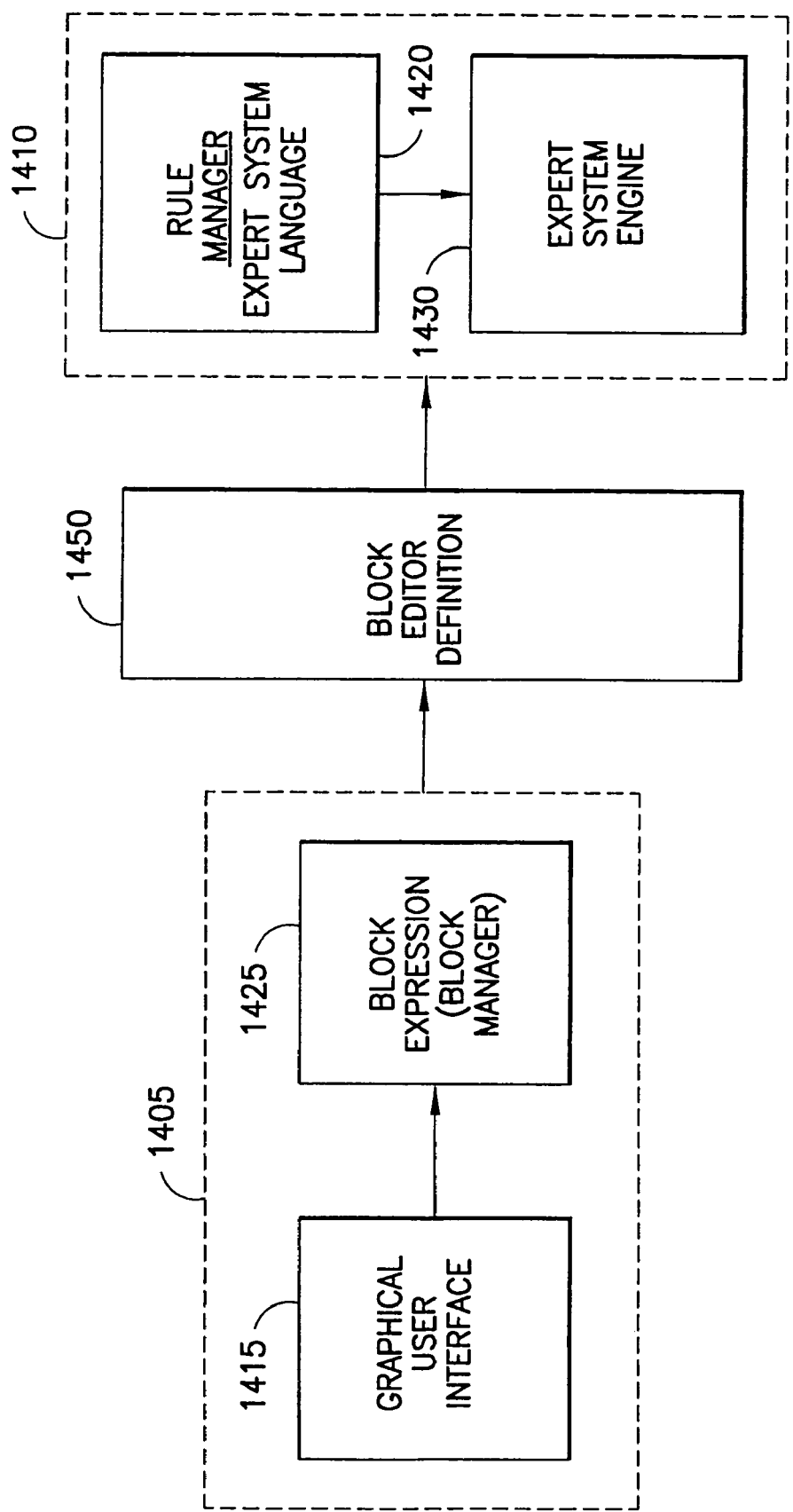
FIG. 14 is a data flow diagram showing the relationship between the user interface of the expert system and the expert system.

The expert system of FIG. 14 shows the relationship between the front end 1405 and the back end 1410 of the overall expert system. The front end 1405 comprises the GUI 1415 and the block expression 1425, which is driven by the block manager in accordance with the block editor definition 1450. The block expression may be presented to the user in a human-readable format that allows the user to see exactly which conditions are to be analyzed and the action to be performed. The front end 1405 is what the user sees and is able to control by creating blocks and inputting values into the data fields of the blocks. The back end of the system 1410 comprises the rule manager 1420 and the expert system engine 1430. The rule manager 1420 takes the block expression created by the user 1425, which was created based on the block editor definition 1450, and converts the block expression into a language usable by the expert system engine 1430. The conversion of the block expression is also based on the block editor definition 1450.

Figure 15:
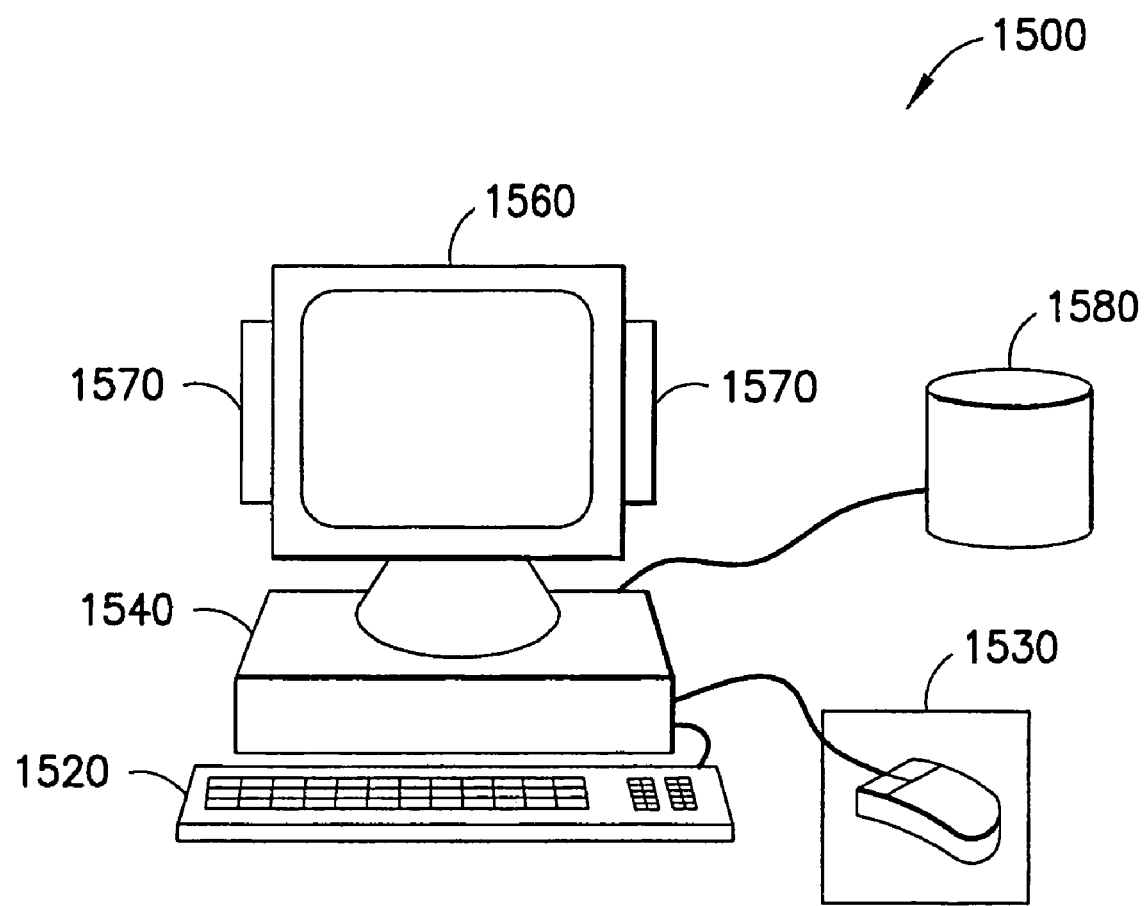
FIG. 15 is a diagram of an exemplary apparatus on which an embodiment of the present invention may be implemented.

An example of an apparatus that can facilitate the creating and editing of a rule that is executable on an expert system is shown in FIG. 15 according to an embodiment of the present invention. The apparatus 1500 comprises an input devices 1520 and 1530, a processor 1540, a display 1560 with audio output devices (such as loudspeakers) 1570, and a database 1580. The input device 1520 is shown as a keyboard and the input device 1530 is shown as a mouse, but any other suitable type of input device can be used. The display 1560 responds to commands from the processor 1540 based on the user's inputs, which are performed using the input devices 1520 and 1530. The processor 1540 may be a personal computer, either standalone or connected to a network. Finally, the database 1580 is preferably any suitable clinical database.

The block manager and the block editor definition will now be described in more detail. The block manager, as referred to in FIG. 3 above, insures that the rule expression entered by the user is logical. The block manager accomplishes this by referring to a block editor definition (BED) file. The BED defines the blocks supported by the rule editor, such as the symbols that may be used within a block. The BED also defines the ways that the blocks may be combined together to make a rule. It is block definition as defined in the BED that the block manager uses to enforce the syntactical relationships between the symbols used in a block as well as how the blocks interact with one another. To make the graphical user interface, which includes the rule editor and rule manager, operable with other expert applications, such as expert financial applications, the BED would merely have to be modified to accommodate the other expert applications. With the modification of the BED file, the user interface may begin writing rules for any other type of expert applications, such as controlling the weaning of patients from intensive care devices or even determining the financial status of a selected commodity, such as oil.

The above described embodiments of the instant invention are merely exemplary embodiments and are not meant to limit the scope of the invention. The embodiments described above can provide a user with a GUI that eliminates the difficulty of formulating a rule for an expert system and provides the user with a logical step-by-step progression from rule creation to rule testing and finally rule implementation. It is clear that modifications may be made to the above-described embodiments of the invention without departing from the scope of this disclosure or the appended claims, including equivalents thereof.

What is claimed is:

1. A rules editor system for use with an expert system, the rules system comprising: a user interface; a rule editor for creating, editing, or creating and editing at least one rule expression, where the rule expression is input by a user through the user interface; a block manager for receiving the rule expression input by the user and for verifying the logic of the rule expression; a rule manager for converting the rule expression into a rule interpretable by the expert system; and a test scenario facility for executing the interpretable rule with sample data values wherein the interpretable rule is capable of being promoted to an enabled rule authorized by the rules editor to be used by an expert system to modify real data in a database.

2. The system of claim 1, wherein the interpretable rule is capable of being set to a test mode in which the interpretable rule is not authorized to modify real data.

3. The system of claim 2, wherein there is a plurality of interpretable rules and the order of the interpretable rules may be modified.

4. The system of claim 1, wherein the user interface is a graphical user interface comprising a display through which (a) the rule editor presents the display for creating, editing, or creating and editing the at least one rule expression, (b) the sample data is entered into a test scenario template and (c) the results of the executed interpretable rule are displayed.

5. The system of claim 4, further comprising a block editor for controlling the graphical presentation of the rule editor, wherein the block manager uses a block editor definition to define the proper combinations of condition inputs and action inputs for a logically correct rule expression.

6. The system of claim 5, wherein the block editor definition further defines specifications for the output to the rule manager.

7. The system of claim 1, wherein the rule expression input by the user comprises a set of condition inputs and action inputs, wherein the conditions pertain to real data features found in the database, and wherein the actions are performed when the conditions set in the rule expression are met.

8. The system of claim 1, wherein the test scenario facility provides a template to the user interface into which sample data values may be entered manually by the user through the user interface or automatically by the rule editor from a clinical database.

9. The system of claim 8, wherein the manually entered and automatically provided template sample data is modifiable by the user for further evaluation of the rule expression.

10. The system of claim 8, wherein the automatically-provided sample data is selected from the clinical database based on the condition inputs in the rule expression.

11. The system of claim 1, wherein the block manager comprises an indicator for indicating whether the at least one condition or action in a rule expression is verified.

12. The system of claim 11, wherein the indicator indicates whether the at least one condition or action have passed or have failed the verification.

13. The expert system of claim 11, wherein the indicator is a text message, an audible alert, a visual indicator or any combination thereof.

14. The system of claim 1, wherein the rule editor responds to condition inputs by the user by providing only logical input choices for editing or creation of the rule expression.

15. The system of claim 1, wherein: the system further comprises a processor; a display that responds to commands from the processor; and the commands are based on user inputs from the user input device.

16. The system of claim 15, wherein: the system further comprises a database; the processor hosts the rule editor, the block manager, the rule manager, and the test scenario facility; and the processor is adapted to access the database.

17. The system of claim 1, further comprising: a processor, an output device, and a database.

18. A method for a user to create or edit a rule in a rules system, for use with an expert system, the method comprising the steps of: inputting at least one condition or action in the form of a rule expression through a user interface, converting the rule expression to a rule interpretable by the expert system; selecting at least one additional condition or action from a set of one or more logical condition or action choices presented by the rules system through the user interface, the selection contributing to the rule expression; creating a test scenario for testing the more than one condition or action of the rule by populating a test scenario template with sample data; initiating execution of the test scenario; and promoting the rule to an enabled rule, wherein the enabled rule is authorized to modify real data stored in a clinical database.

19. The method of claim 18, further comprising the step of repeating the inputting and selecting steps until the rules system presents a final choice for a logical condition or action for the rule expression.

20. The method of claim 18, wherein the at least one condition or action comprises a plurality of conditions and actions.

21. The method of claim 18, further comprising the step of setting the rule to a test rule, wherein the test rule is not authorized to modify real data.

22. The method of claim 18, wherein the inputting and the repeating steps further comprise inputting the conditions and/or actions into a graphical user interface that uses an IF-THEN logical block format.

23. The method of claim 18, further comprising the step of setting the priority of a plurality of enabled rules.

24. The method of claim 18, further comprising the step of overwriting standard rules of the expert system.

25. A computer-readable medium having computer-executable instructions arranged for performing a method for creating and editing rules for an expert system comprising the steps of: accepting input of at least one condition or action choices for a rule; presenting to a user a set of one or more logical condition or action choices in response to the data input; accepting the user's selection of a condition or action from the presented logical condition or action choices; repeating the steps of accepting input, presenting, and accepting the user's selection; verifying that the rule is logically correct; converting the rule into a rule interpretable by the expert system; creating a test scenario for the conditions and actions selected by the user for the rule, wherein a test scenario template is adapted to receive sample data from a the user; presenting the user with the results of the test scenario through a user interface; and allowing promotion of the rule to an enabled rule authorized to modify real data stored in a clinical database.

26. The method of claim 25, wherein the at least one action or condition comprises a plurality of conditions and actions.

27. The method of claim 25, further comprising the step of allowing the rule to be set to a test mode, wherein the rule is not authorized to modify real data.

28. The method of claim 25, wherein the inputting and the repeating steps further comprise inputting the condition or action choices into a graphical user interface that receive the input in an IF-THEN logical block format.

* * * * *